United States Patent
Cheng et al.

(10) Patent No.: US 10,411,935 B2
(45) Date of Patent: *Sep. 10, 2019

(54) SYSTEM AND METHOD FOR DFT-S-OFDM PAPR REDUCTION

(71) Applicant: Futurewei Technologies, Inc., Plano, TX (US)

(72) Inventors: Qian Cheng, Aurora, IL (US); Weimin Xiao, Hoffman Estates, IL (US); Jialing Liu, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,599

(22) Filed: Nov. 20, 2017

(65) Prior Publication Data

US 2018/0167244 A1    Jun. 14, 2018

Related U.S. Application Data

(63) Continuation of application No. 15/376,809, filed on Dec. 13, 2016, now Pat. No. 9,847,897.

(51) Int. Cl.
*H04L 27/26* (2006.01)
*H04L 5/00* (2006.01)
*H04L 12/26* (2006.01)

(52) U.S. Cl.
CPC .......... *H04L 27/262* (2013.01); *H04L 5/0048* (2013.01); *H04L 27/2621* (2013.01);
(Continued)

(58) Field of Classification Search
CPC . H04L 27/2626; H04L 27/2607; H04L 27/26; H04L 27/2628; H04L 27/263; H04L 27/262
(Continued)

(56) References Cited

U.S. PATENT DOCUMENTS 9,847,897 B1 * 12/2017 Cheng .................. H04L 27/262
2005/0265226 A1   12/2005 Shen et al.
(Continued)

FOREIGN PATENT DOCUMENTS

| CN | 101218769 A | 7/2008 |
| CN | 102077536 A | 5/2011 |
| WO | 2007048278 A1 | 5/2007 |

OTHER PUBLICATIONS

"DFT circular shifts OFDM," Google Scholar, 2 pages, Aug. 8, 2017.
"DFT cyclic shifts," Google Scholar, 2 pages, Aug. 8, 2017.

*Primary Examiner* — Emmanuel Bayard
(74) *Attorney, Agent, or Firm* — Slater Matsil, LLP

(57) ABSTRACT

A method for reducing a peak to average power ratio (PAPR) of an orthogonal frequency division multiplexing (OFDM) signal. A first signal in the frequency domain is processed to generate a second signal by performing a modular permutation on the first signal according to a modular permutation index, and/or by performing a cyclic shift on the first signal according to a cyclic shift parameter. The second signal is then mapped to a number of tones, and transformed into a time-domain signal for transmission. The modular permutation index and/or the cyclic shift parameter are selected so that the signal for transmission has a PAPR that satisfies a predefined PAPR criteria.

20 Claims, 5 Drawing Sheets

(52) U.S. Cl.
CPC ...... *H04L 27/2628* (2013.01); *H04L 27/2636* (2013.01); *H04L 27/2639* (2013.01); *H04L 43/16* (2013.01); *H04L 27/2601* (2013.01)

(58) Field of Classification Search
USPC .................................................. 375/260, 295
See application file for complete search history.

(56) References Cited

U.S. PATENT DOCUMENTS

| | | |
|---|---|---|
| 2006/0002361 A1 | 1/2006 | Webster et al. |
| 2007/0211807 A1 | 9/2007 | Han et al. |
| 2009/0141620 A1 | 6/2009 | Hwang et al. |
| 2009/0168730 A1 | 7/2009 | Baum et al. |
| 2010/0008432 A1 | 1/2010 | Kim et al. |
| 2010/0165829 A1 | 7/2010 | Narasimha et al. |
| 2012/0014349 A1 | 1/2012 | Chung et al. |
| 2013/0077714 A1* | 3/2013 | Lim .................... H04L 27/2636 375/302 |
| 2014/0161169 A1 | 6/2014 | Primerano et al. |
| 2015/0156638 A1 | 6/2015 | Yerramalli et al. |
| 2015/0304146 A1 | 10/2015 | Yang et al. |
| 2016/0254889 A1 | 9/2016 | Shattil |

* cited by examiner

SYSTEM AND METHOD FOR DFT-S-OFDM PAPR REDUCTION

This application is a continuation of U.S. patent application Ser. No. 15/376,809, filed on Dec. 13, 2016, and entitled "System and Method for DFT-S-OFDM PAPR Reduction", which is hereby incorporated by reference herein as if reproduced in its entirety.

TECHNICAL FIELD

The present invention relates generally to wireless communications, and in particular embodiments, to techniques and mechanisms for DFT-S-OFDM PAPR reduction.

BACKGROUND

Orthogonal frequency division multiplexing (OFDM) is a multi-carrier modulation technique that has been widely used in digital communication systems. It has many advantages such as high spectral efficiency, resiliency to radio frequency (RF) interference, lower multi-path distortion, and high bit rates. However, OFDM suffers a high peak to average power ratio (PAPR) at transmitted signals, which causes significant signal degradation and thus reduces transmission efficiency. It is desirable to develop methods and apparatuses for reducing PAPRs in OFDM systems.

SUMMARY OF THE INVENTION

Technical advantages are generally achieved, by embodiments of this disclosure which describe a system and method for DFT-S-OFDM PAPR reduction.

In accordance with an embodiment, a method for wireless communications is provided. The method includes performing, by a device, a discrete Fourier transform (DFT) on a data stream to generate a first signal in the frequency domain. The method further includes processing, by the device, the first signal in the frequency domain to generate a second signal in the frequency domain by performing a modular permutation on the first signal in accordance with a modular permutation index. The modular permutation index is an integer, and the greatest common divisor of the modular permutation index and a number of DFT points used in the DFT is equal to one. The modular permutation is a modular arithmetic operation that rearranges an order of elements in a sequence of the first signal. The method also includes processing, by the device, the second signal to generate an orthogonal frequency division multiplexing (OFDM) symbol, and transmitting, by the device, the OFDM symbol. The modular permutation index is determined so that the OFDM symbol satisfies a peak to average power ratio (PAPR) criteria. An apparatus for implementing the method is also provided.

In accordance with another embodiment, a method for wireless communications is provided. The method includes performing, by a device, a discrete Fourier transform (DFT) on a data stream to generate a first signal in the frequency domain. The method further includes processing, by the device, the first signal in the frequency domain to generate a second signal in the frequency domain by performing a cyclic shift on the first signal in accordance with a cyclic shift parameter. The cyclic shift parameter is an integer that is less than a number of DFT points used in performing the DFT. The method also includes processing, by the device, the second signal to generate an OFDM symbol, and transmitting, by the device, the OFDM symbol. The cyclic shift parameter is determined so that the OFDM symbol satisfies a PAPR criteria. An apparatus for implementing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
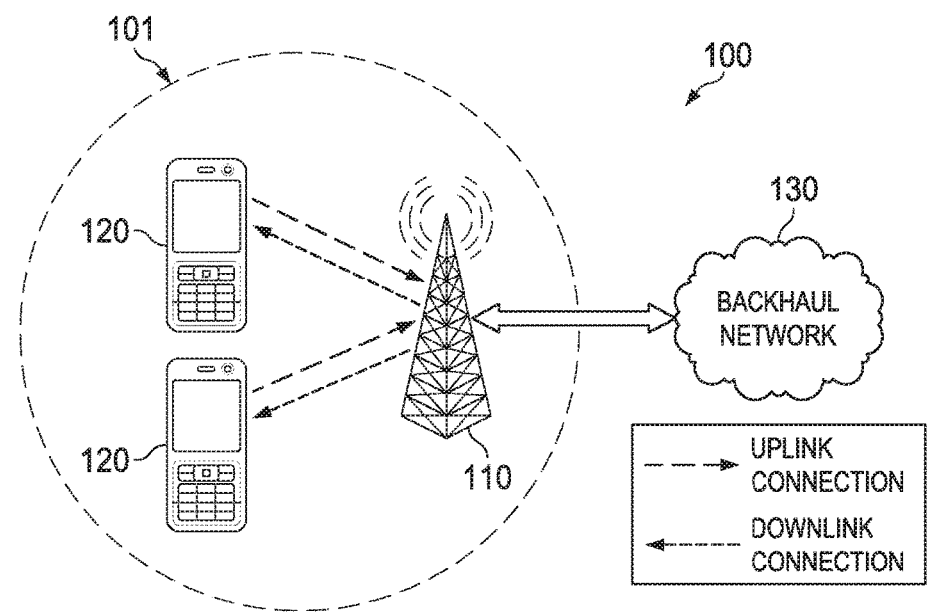
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Orthogonal frequency division multiplexing (OFDM) systems have been known to suffer high peak to average power ratio (PAPR) at transmitted signals. High PAPRs are undesirable because they cause increased signal degradation, increased power consumption, and reduced power efficiency.

Aspects of this disclosure provide an embodiment method for reducing PAPRs at transmitted OFDM signals. In accordance with one embodiment, a data stream to be transmitted is transformed into a first signal in the frequency domain using a discrete Fourier transform (DFT). The first signal in the frequency domain may then be processed to generate a second signal, by performing a modular permutation on the first signal according to a modular permutation index. The modular permutation is a modular arithmetic operation that rearranges the order of elements in a sequence of the first signal. In another embodiment, the first signal may also be processed to generate the second signal by performing a cyclic shift on the first signal according to a cyclic shift parameter. In yet another embodiment, the first signal may be processed to generate the second signal by performing a modular permutation and a cyclic shift on the first signal to generate the second signal according to a modular permutation index and a cyclic shift parameter.

The second signal is then mapped to a number of tones or subcarriers, and transformed into the time domain to generate an OFDM signal in the time domain for transmission. By changing the modular permutation index and/or cyclic shift parameter, the generated OFDM signals in the time domain may have different PAPRs. The modular permutation index and/or the cyclic shift parameter used in performing the modular permutation and/or the cyclic shift may be determined or selected by identifying a generated OFDM signal that has a PAPR satisfying a predefined PAPR criteria. For example, an OFDM signal may be identified when a PAPR of the OFDM signal is less than a threshold.

The modular permutation index and/or the cyclic shift parameter used by a transmitter side for transmitting an OFDM signal may be communicated to a receiver side for receiving data included in the OFDM signal. In one embodiment, the modular permutation index and/or the cyclic shift parameter may be signaled in downlink control information. In another embodiment, a pilot reference signal may be processed similar to the first signal, by performing a modular permutation and/or a cyclic shift on the pilot reference signal using the same modular permutation index and/or the cyclic shift parameter as the first signal, and transmitted to the receiver side. The receiver side may detect the modular permutation index and/or the cyclic shift parameter from the pilot reference signal. The embodiment method may be used for transmitting OFDM signals on either a network side or a user side.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

When the network 100 operates in high frequencies, such as in a millimeter wave (mmWave) frequency, wireless signals communicated in the network 100 suffer high path loss, and their coverage area is thus reduced. In some embodiments, analog beamforming with a larger number of antenna elements may be used to compensate for the path loss and extend the range of high frequency wireless signals. For example, a multi-input multi-output (MIMO) OFDM system may be used to reduce the impact of path loss.

In a conventional transmitter structure, an antenna element is generally driven by a power amplifier. Transmitted signals with a significant PAPR may cause a power amplifier to run within a non-linear operating region. This causes significant signal distortion at the output of the power amplifier. To reduce the distortion, the power amplifier will have to operate with a large power back-off, which leads to inefficient operation of the power amplifier and consequently, reduced signal coverage.

OFDM has been known to suffer a high PAPR. An OFDM symbol includes a number of independently modulated subcarriers/sinusoids which may give a large PAPR when added up coherently. For example, when signals from N subcarriers are added up with the same phase, they produce a peak power that is N times the average power of the signals.

Figure 2:
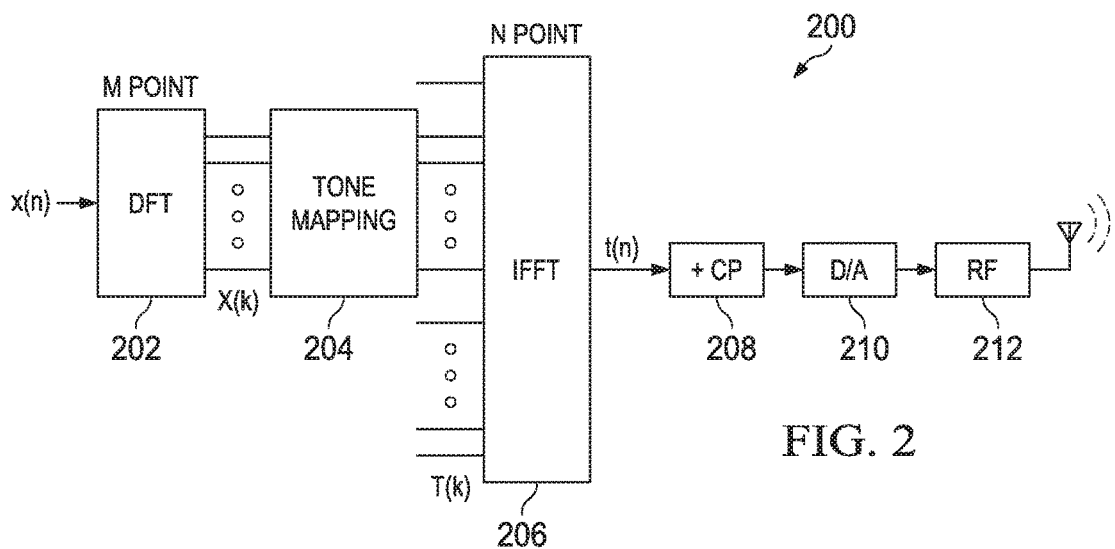
FIG. 2 illustrates a block diagram of an embodiment transmitter structure using discrete Fourier transform-spread-orthogonal frequency division multiplexing (DFT-S-OFDM)

The third generation partnership project (3GPP) Long Term Evolution (LTE) adopted a discrete Fourier transform-spread-OFDM (DFT-S-OFDM) technique that has been shown to result in reduced PAPRs in transmitted OFDM signals compared with a conventional OFDM system. FIG. 2 illustrates a block diagram of an embodiment transmitter structure 200 using the DFT-S-OFDM technique in compliance with the 3GPP LTE. As shown, the transmitter structure 200 includes a DFT unit 202, a tone mapping unit 204, an inverse fast Fourier transform (IFFT) unit 206, a cyclic prefix (CP) unit 208, a digital-to-analog (D/A) converter 210, and a radio frequency (RF) unit 212. An input signal, e.g., a data stream, x(n) is processed by these components to generate OFDM symbols/signals for transmission.

As shown, the DFT unit 202 performs an M-point DFT on the input signal x(n) and generates a signal X(k) in the frequency domain. The DFT unit 202 multiplexes the input signal in specific subcarriers within an overall system bandwidth prior to other operations in the transmitter structure 200. X(k) is then mapped to a set of predetermined tones (or subcarriers) by the tone mapping unit 204, and the output of the tone mapping unit 204 is converted into an N-point signal T(k) and fed into the IFFT unit 206. The IFFT unit 206 performs an N-point IFFT on T(K) and outputs an OFDM signal t(n) in the time domain, e.g., one or more OFDM symbols, that is to be transmitted. Cyclic prefix is then inserted in t(n) by the CP unit 208, and the signal t(n) with inserted cyclic prefix is thereafter converted into an analog signal by the D/A converter 210. The analog signal is converted into a RF signal by the RF unit 212 for transmission through an antenna. The detailed operations and structures of the DFT unit 202, tone mapping unit 204, IFFT unit 206, CP unit 208, D/A converter 210 and RF unit 212 are well known in the art, and hence are not discussed herein.

The transmitter structure is estimated to be able to achieve about a 3 dB PAPR reduction in t(n) compared with conventional OFDM systems. However, the PAPR is still worse than that of a single carrier system. Moreover, it has been anticipated that, in mmWave wireless communications, DFT-S-OFDM waveforms may be employed for both downlink and uplink transmissions, especially for coverage critical situations. It would therefore be appreciated if PAPRs in DFT-S-OFDM systems may be further reduced, and consequently, efficiency of power amplifiers may be improved and transmission coverage may be increased.

The input signal x(n) in the time domain may be processed to generate a signal x'(n) using the following Equation (1):

$$x'(n) = x[(A \cdot n) \bmod M] \cdot e^{-\frac{j2\pi Bn}{M}} \quad (1)$$

where n is an integer and n=0, 1, ..., N−1, M is the number of DFT point used by the DFT unit 202, A is an integer and the greatest common divisor (GCD) of A and M is 1, i.e., GCD(A,M)=1, B is an integer less than M (i.e., B<M), and "mod" denotes a modular arithmetic operation.

To put in another way, Equation (1) shows that the input signal x(n) is processed by performing a modular permutation and a cyclic shift. The modular arithmetic operation performed on x(n) is referred to as a modular permutation because it rearranges the order of elements in a sequence of the input signal x(n). Cyclic shift is a well know technique of rearranging elements in a sequence by shifting the elements in one direction (right or left) by B times, and the last element in the sequence is shifted to the first position of the sequence, or the first element is shifted to the last position. A is referred to as a modular permutation parameter or index, and B is referred to as a cyclic shift parameter or index.

For example, if the signal x(n) is a sequence of size 8 in the time domain represented by {x(0), x(1), x(2), x(3), x(4), x(5), x(6), x(7)}, A=3 and B=5, and x'(n) is represented by {x'(0), x'(1), x'(2), x'(3), x'(4), x'(5), x'(6), x'(7)}, a modular permutation performed on x(n) will result in x"(n)={x(8), x(3), x(6), x(1), x(4), x(7), x(2), x(5)}. A modular permutation and a cyclic shift performed on x(n) will result in a sequence x'(n) as shown in the follows:

{x'(0),x'(1),x'(2),x'(3),x'(4),x'(5),x'(6),x'(7)}={x(1),x(4), x(7),x(2),x(5),x(8),x(3),x(6)}

It can be seen that both x"(n) and x'(n) include elements of x(n) that are reordered. When DFT is performed on x(n) and x'(n) to generate a signal X(k) and a signal X'(k) in the frequency domain, respectively, X(k) and X'(k) have a relationship represented by Equation (2) in the following:

$$X'(k) = X'[(A \cdot k + B) \bmod M] \quad (2)$$

where k is an integer and k=0, 1, ..., k−1.

Thus, if X(k) is represented by {X(0), X(1), X(2), X(3), X(4), X(5), X(6), X(7)}, X'(k) can be represented by X(k) as follows:

{X'(0),X'(1),X'(2),X'(3),X'(4),X'(5),X'(6),X'(7)}={X(8), X(3),X(6),X(1),X(4),X(7),X(2),X(5)}

It can be seen that X'(k) also includes elements of X(k) that are reordered. Equations (1) and (2) show that, if modular permutation and cyclic shift are performed on X(k) which is the DFT of the input signal x(n), the resulted X'(k) will be the DFT of x'(n) that is generated by performing modular permutation and cyclic shift on x(n) using the same modular permutation and cyclic shift parameters as used on X(k). This shows that modular permutation and cyclic shift performed on the DFT X(k) of a signal x(n) in the time domain maintains characteristics of x(n) itself. For example, if the input sequence x(n) has a low PAPR, x'(n) may also have a low PAPR.

Performing modular permutation and cyclic shift on a signal in the frequency domain, though not changing characteristics of the signal, may be beneficial for changing a PAPR of the signal when the signal is transmitted in an OFDM system. As discussed above, an OFDM signal in the time domain, such as t(n) in FIG. 2, includes a number of independently modulated subcarriers/sinusoids added up in the time domain. Changing the order of an input signal sequence may change the phases of the modulated subcarriers with respect to each other, and as a result, these modulated subcarriers may add up in the time domain to produce different peak amplitudes. This may result in transmitted OFDM signals with different PAPRs.

Thus, in FIG. 2, when modular permutation and cyclic shift are performed on an input signal in the time domain, e.g., x(n), or on the input signal in the frequency domain, e.g., X(k), with different modular permutation parameters and cyclic shift parameters, the OFDM signal t(n) generated for transmission may have different PAPRs. An OFDM signal t(n) with a smaller PAPR may be selected and transmitted, so as to reduce the PAPR at the transmitted signal t(n).

Figure 3:
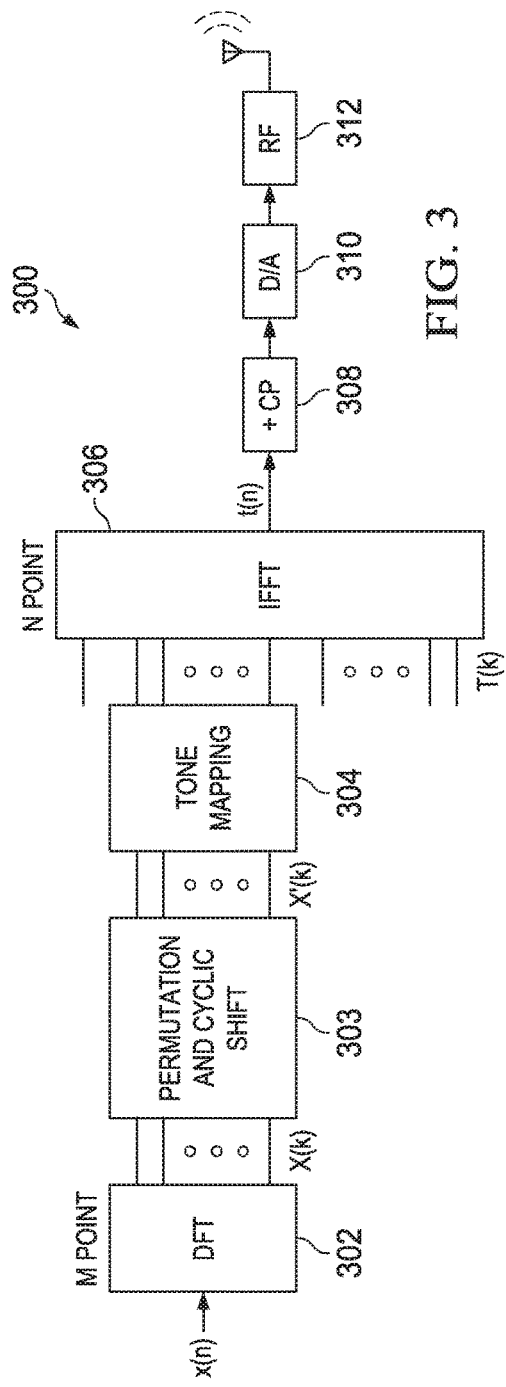
FIG. 3 illustrates a block diagram of another embodiment transmitter structure using DFT-S-OFDM.

FIG. 3 illustrates a block diagram of another embodiment transmitter structure 300 using the DFT-S-OFDM technique. The transmitter structure 300 includes a DFT unit 302, a tone mapping unit 304, an IFFT unit 306, a CP unit 308, a D/A converter 310, and a RF unit 312. These components operate similarly to the corresponding components shown in FIG. 2.

The transmitter structure 300 further includes a permutation and cyclic shift unit 303. The permutation and cyclic shift unit 303 processes the output signal X(k) of the DFT unit 302 by performing a modular permutation and/or a cyclic shift on X(k) in accordance with a modular permutation parameter A and/or a cyclic shift parameter B. The permutation and cyclic shift unit 303 may only perform a modular permutation on X(k). Alternatively, the permutation and cyclic shift unit 303 may only perform a cyclic shift on X(k). In other embodiments, the permutation and cyclic shift unit 303 may perform both a modular permutation and a cyclic shift on X(k). In this case, the permutation and cyclic shift unit 303 may perform a modular permutation first on X(k) and then a cyclic shift. Alternatively, the permutation and cyclic shift unit 303 may perform a cyclic shift on X(k) first and then a modular permutation. Whether modular permutation, cyclic shift, or both will be performed may be predetermined or determined dynamically based on factors such as the type of the signals to be transmitted, or a requirement on a PAPR. The permutation and cyclic shift unit 303 outputs a signal X'(k) and feeds it into the tone mapping unit 304. X'(k) is then mapped to a number of tones by the tone mapping unit 304 and transformed into the time domain by the IFFT unit 306 to generate an OFDM signal t(n). t(n) is then processed by the CP unit 308, the D/A converter 310 and the RF unit 312 similarly to those described with respect to the corresponding components in FIG. 2, and transmitted through an antenna.

As described above, the OFDM signal t(n) output from the IFFT unit 306 may have different PAPRs when different modular permutation parameters and/or cyclic shift parameters are used to perform modular permutation and/or cyclic shift on X(k). Thus, when the same signal X(k) in the frequency domain is processed by the permutation and cyclic shift unit 303 with different modular permutation parameters and/or cyclic shift parameters, a set of OFDM signals t(n) with different PAPRs may be generated. The different modular permutation parameters and/or cyclic shift parameters may be viewed to correspond to the set of OFDM signals t(n) with different PAPRs. The set of OFDM signals t(n) may be used to select an OFDM signal t(n) with a PAPR satisfying a predefined criteria related to PAPRs. The set of OFDM signals t(n) may also be used to select a modular permutation parameter and/or a cyclic shift parameter that is corresponding to an OFDM signal t(n) with a PAPR satisfying a predefined PAPR criteria. The selected modular permutation parameter and/or cyclic shift parameter may be used to process a single input signal (e.g., a single OFDM input symbol) or a number of input signals (e.g., multiple OFDM input symbols) of the transmitter structure 300, so that these signals may be transmitted with a PAPR satisfying a PAPR criteria. Examples of a predefined criteria may include that a PAPR is less than a threshold, or a PAPR has the minimum value among all PAPRs of a set of signals t(n) generated using different modular permutation parameters and/or cyclic shift parameters. One of ordinary skill in the art would recognize that other criteria related to PAPR may also be applicable in the embodiment method.

In some embodiments, a range of the modular permutation parameter A and/or a range of the cyclic shift B may be predefined, such as $A \in \{A1, A2\}$, and $B \in \{B1, B2\}$. When only modular permutation is performed by the permutation and cyclic shift unit 303, in some embodiments, each of the modular permutation parameter in the range of $\{A1, A2\}$ may be used to perform a modular permutation on X(k) and a corresponding t(n) is calculated. A t(n) with a PAPR satisfying a predefined PAPR criteria may then be identified and used for transmission. A modular permutation parameter that is corresponding to the identified t(n) may be identified and used for processing X(k) and/or other signals.

In some embodiments, when only cyclic shift is performed, each of the cyclic parameter in the range of $\{B1, B2\}$ may be used to perform a cyclic shift on X(k) and a corresponding t(n) is calculated. Similarly, a t(n) with a PAPR satisfying a predefined PAPR criteria may then be identified and used for transmission.

In other embodiments, when both the modular permutation and cyclic shift are performed, each pair of modular permutation and cyclic shift parameters (A, B) selected from the range of $\{A1, A2\}$ and $\{B1, B2\}$ may be used to perform a modular permutation and a cyclic shift on X(k) and a corresponding t(n) is calculated. Then a t(n) with a PAPR satisfying a predefined PAPR criteria may be identified and used for transmission. In this way, a data stream may be transmitted using an OFDM signal with a PAPR satisfying a predefined PAPR criteria.

In any of the above cases where only modular permutation, only cyclic shift, or both modular permutation and cyclic shift are performed, a modular permutation parameter and/or a cyclic shift parameter may be selected or determined from a corresponding range, e.g., $\{A1, A2\}$ and/or $\{B1, B2\}$ by identifying a corresponding t(n) with a PAPR satisfying a PAPR criteria. These parameters may be determined in advance or when needed. The selected parameters may be saved in a database and obtained for processing signals. The modular permutation parameters and/or cyclic shift parameters may be selected or determined for individual signals (e.g., individual OFDM input symbols), a number of signals (e.g., a number of OFDM input symbols), or different types of signals. For example, modular permutation parameters and/or cyclic shift parameter may be determined in advance for different types of input signals of the transmitter structure 300. When a signal of a type is input in the transmitter structure 300, a corresponding modular permutation parameter and/or a cyclic shift parameter predetermined for this type of signals may be obtained and used by the permutation and cyclic shift unit 303.

In some embodiments, different modular permutation parameter ranges and/or cyclic shift parameter ranges with different sizes may be predetermined, and one or more of these ranges may be selected to be used in determining a modular permutation parameter and/or a cyclic shift parameter for performing modular permutation and/or cyclic shift on signals. Which modular permutation parameter ranges and/or cyclic shift parameter ranges will be used may be predetermined or determined dynamically, based on, e.g., factors that may affect PAPRs of transmitted signals.

As show in FIG. 3, calculation of the OFDM signal t(n) involves an IFFT operation. When calculating t(n) from X(k) using each modular permutation parameter and/or cyclic shift parameter selected from a modular permutation parameter range $\{A1, A2\}$ and/or a cyclic shift parameter range $\{B1, B2\}$, computation complexity for calculating t(n) is high. The computation complexity will be increased when a large number of tones are used. For coverage critical communications, when resources allocated are limited, the computation complexity may be reduced but is still high.

In some embodiments, algorithms may be developed and/or used to reduce the complexity for calculating a set of t(n) from a set of X'(k) that are generated by performing modular permutation and/or cyclic shift on X(k). Taking the transmitter structure 300 as an example, when no modular permutation and/or cyclic shift is performed on X(k) by the permutation and cyclic shift unit 303, t(n) can be expressed as:

$$t(n) = \sum_{k=0}^{N-1} T(k) \cdot e^{\frac{j2\pi nk}{N}} = \sum_{k=0}^{M-1} X(k) \cdot e^{\frac{j2\pi n(k+p)}{N}}$$

where the output signal of the DFT unit 302, i.e., X(k), is mapped to tones from p to p+M−1, and p is an integer. In this case, t(n) is similar to that shown in FIG. 2.

When only cyclic shift is performed by the permutation and cyclic shift unit 303, with a cyclic shift parameter B=1, X'(k) can be expresses as:

$$X'(k) = X[(k-1) \mod M]$$

Figure 4:
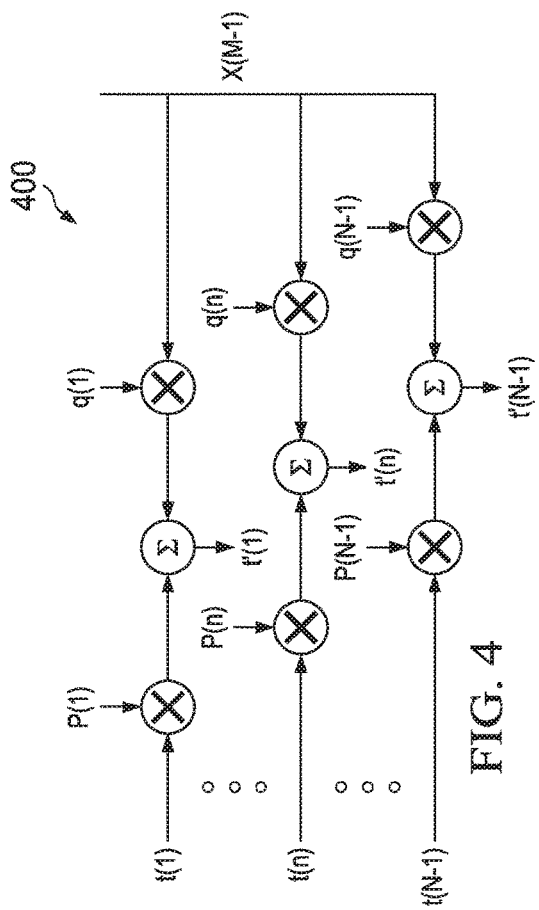
FIG. 4 illustrates a diagram of an embodiment method for calculating a transmitted signal in FIG. 3.

Then, the output signal of the IFFT unit 306 can be expressed as:

$$\begin{aligned} t'(n) &= \sum_{k=0}^{M-1} X'(k) \cdot e^{\frac{j2\pi n(k+p)}{N}} \quad (3) \\ &= X(M-1) \cdot e^{\frac{j2\pi np}{N}} + \sum_{k=1}^{M-1} X(k-1) \cdot e^{\frac{j2\pi n(k+p)}{N}} \\ &= X(M-1) \cdot e^{\frac{j2\pi np}{N}} + \\ &\quad \left( \sum_{k=0}^{M-1} X(k) \cdot e^{\frac{j2\pi n(k+p)}{N}} - X(M-1) \cdot e^{\frac{j2\pi n(M-1+p)}{N}} \right) \cdot e^{\frac{j2\pi n}{N}} \\ &= t(n) \cdot e^{\frac{j2\pi n}{N}} + X(M-1) \cdot \left( e^{\frac{j2\pi np}{N}} - e^{\frac{j2\pi n(M+p)}{N}} \right) \\ &= t(n) \cdot p(n) + X(M-1) \cdot q(n) \end{aligned}$$

where $p(n) = e^{\frac{j2\pi n}{N}}$, $q(n) = \left( e^{\frac{j2\pi np}{N}} - e^{\frac{j2\pi n(M+p)}{N}} \right).$ Equation (3) shows that the output signal t'(n) of the IFFT unit 306, when cyclic shift is performed on X(k) with a cyclic shift parameter equal to 1, can be calculated using the output signal t(n) of the IFFT unit 306 when no modular permutation and cyclic shift are performed on X(k). In this case, there is no need to do an IFFT calculation to generate t'(n). FIG. 4 illustrates a diagram of an embodiment method 400 for calculating t'(n) from t(n), where n=1, . . . N−1, according to Equation (3). The embodiment method greatly reduces the complexity for calculating t'(n) and identifying a t'(n) with a PAPR satisfying a criteria.

Other methods may also be used to reduce the complexity. For example, only a subset of a modular permutation range and/or a cyclic shift range may be used, or only one of the modular permutation and the cyclic shift may be performed using a subset of a predetermined parameter range. One of ordinary skill in the art would recognize that various methods or algorithms may be developed or used to reduce complexity caused by calculating a plurality of signals output by the IFFT unit 306 corresponding to different modular permutation parameters and/or cyclic shift parameters.

When an input signal x(n) of the transmitter structure 300 is processed using a modular permutation and/or a cyclic shift operation and transmitted, the corresponding modular permutation parameter and/or cyclic shift parameter used in the operation may also need to be communicated to a receiver side that receives the transmitted signal, so that the receiver side may receive the correct signal x(n).

In some embodiments, a modular permutation parameter and/or a cyclic shift parameter used by a transmitter side may be transmitted to a receiver side using downlink control information (DCI) signaling. For example, a modular permutation parameter and/or a cyclic shift parameter may be transmitted as DCI with data scheduling information in a physical downlink control channel (PDCCH). In other embodiments, a modular permutation parameter and/or a cyclic shift parameter may be blind detected by a receiver side from a pilot reference signal that is processed using the same modular permutation parameter and/or cyclic shift parameter as the transmitted signals.

In some embodiments, a predetermined number of signals, e.g., a number of OFDM input symbols, may be processed in the frequency domain by preforming a modular permutation and/or a cyclic shift using the same modular permutation parameter and/or cyclic shift parameter. In this case, the modular permutation parameter and/or cyclic shift parameter that will be used for processing the signals may be predetermined. Information about the predetermined number of signals, and the modular permutation parameter and/or cyclic shift parameter that is predetermined may be a priori known by both the transmitter side and the receiver side. Alternatively, the information may be semi-statically communicated to the receiver side. One of ordinary skill in the art would recognize that other methods may also be used to communicate the modular permutation parameter and/or cyclic shift parameter used by a transmitter side to a receiver side.

The transmitter structure 300 and the embodiment method may be applied to a network side, such as a BS, and to a user side, such as a mobile device. In either case, a receiver side needs to know the modular permutation and/or cyclic shift parameter that are used by a transmitter side, so that the receiver side may correctly receive signals transmitted.

Figure 5:
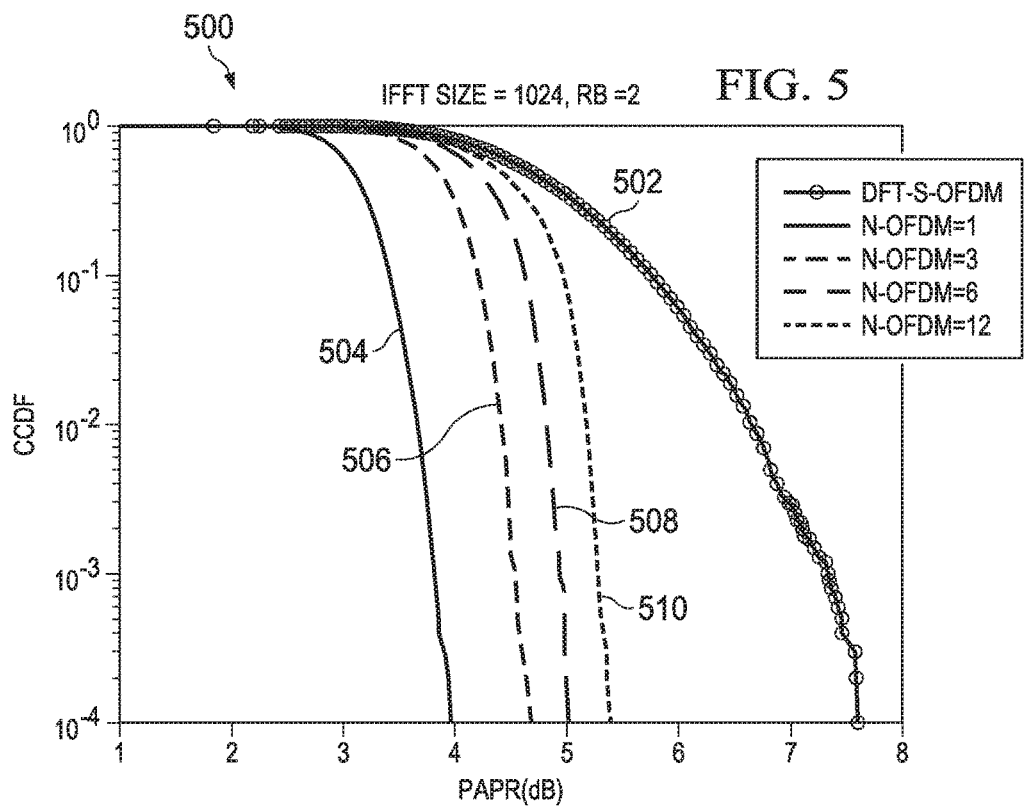
FIG. 5 is graph showing how a complementary cumulative distribution function (CCDF) varies with a peak to average power ratio (PAPR)

FIG. 5 is a graph 500 showing how a complementary cumulative distribution function (CCDF) of transmitted OFDM signals varies with a PAPR (in dB). In this example, the size of IFFT is 1024 and 2 resource blocks are allocated for data transmission. Curve 502 shows how the CCDF varies with the PAPR for signals transmitted by the transmitter structure in FIG. 2. Curves 504, 506, 508 and 510 show, respectively, how the CCDF varies with the PAPR for signals transmitted with the transmitter structure in FIG. 3, when 1, 3, 6 and 12 OFDM symbols use the same modular permutation parameter and cyclic shift parameter for performing both modular permutation and cyclic shift. It can be seen from curve 504 that, when modular permutation parameters and cyclic shift parameters are selected for individual OFDM symbols, the PAPR gain at CCDF=$10^{-4}$ is about 4 dB compared with curve 502. FIG. 5 also shows that as the number of OFDM symbols using the same modular permutation parameter and cyclic shift parameter increases, the PAPR gain, compared with curve 502, decreases.

Figure 6:
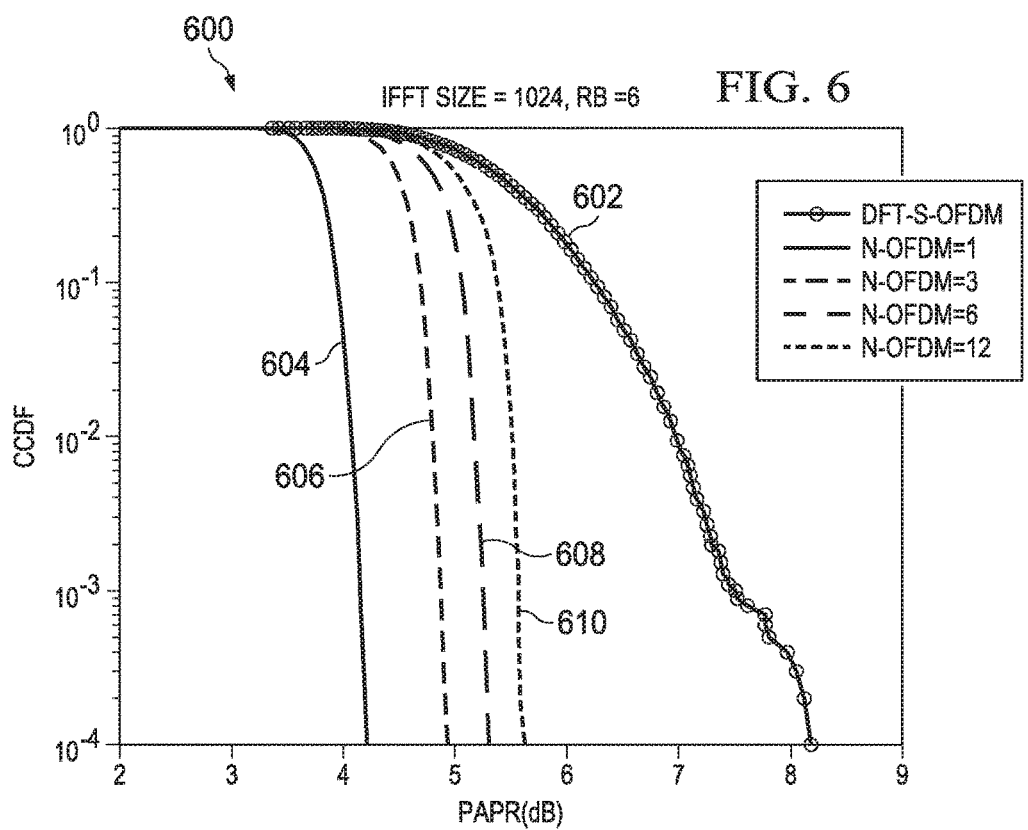
FIG. 6 is another graph showing how a CCDF varies with a PAPR.

FIG. 6 is another graph 600 showing how a CCDF of transmitted OFDM signals varies with a PAPR (in dB). In this example, the size of IFFT is 1024 and 6 resource blocks are allocated for data transmission. Curve 602 shows how the CCDF varies with the PAPR for signals transmitted using the transmitter structure in FIG. 2. Curves 604, 606, 608 and 610 show, respectively, how the CCDF varies with the PAPR for signals transmitted using the transmitter structure in FIG. 3, when 1, 3, 6 and 12 OFDM symbols use the same modular permutation parameter and cyclic shift parameter for performing both modular permutation and cyclic shift. Similarly, FIG. 6 also shows that the PAPR gain compared with curve 502 decreases when the number of OFDM symbols using the same modular permutation parameter and cyclic shift parameter increases. FIG. 5 and FIG. 6 further show that similar PAPR gains are obtained when different numbers of resource blocks are allocated for transmission.

Figure 7:
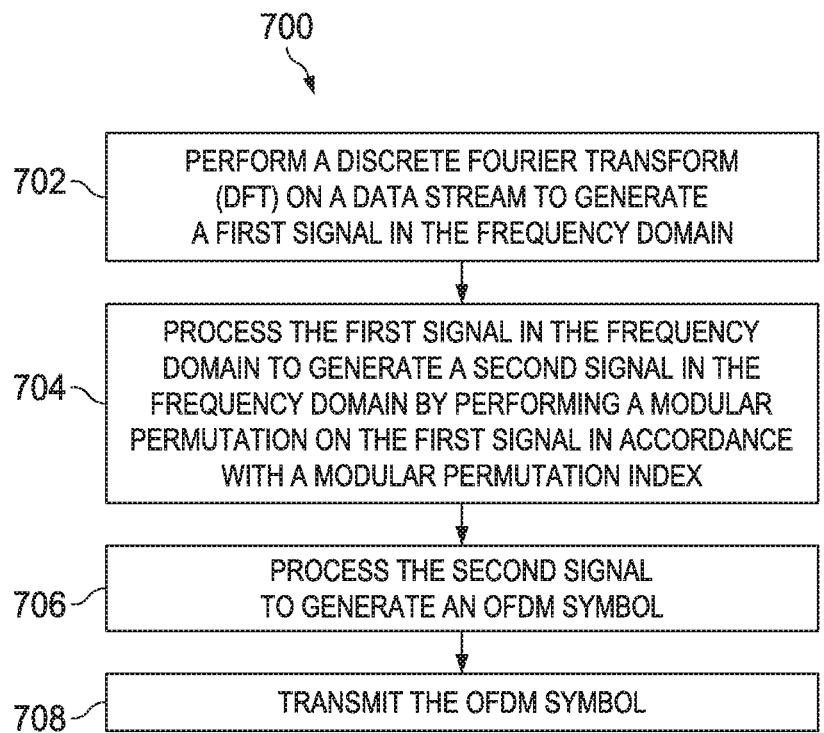
FIG. 7 illustrates a flowchart of an embodiment method for wireless communications.

FIG. 7 illustrates a flowchart of an embodiment method 700 for wireless communications. At step 702, the method 700 performs a discrete Fourier transform (DFT) on a data stream to generate a first signal in the frequency domain. At step 704, the method 700 processes the first signal in the frequency domain to generate a second signal in the frequency domain, by performing a modular permutation on the first signal in accordance with a modular permutation index. The modular permutation index is an integer, and the greatest common divisor of the modular permutation index and a number of DFT points used in the DFT is equal to one. The modular permutation is a modular arithmetic operation that rearranges an order of elements in a sequence of the first signal. At step 706, the method 700 processes the second signal to generate an OFDM symbol. In one embodiment, similar to the method shown in FIG. 3, the method 700 may map the second signal to a number of tones, transform the second signal mapped to the tones into a time-domain signal, and process the time-domain signal for transmission. At step 708, the method 700 transmits the OFDM symbol. The modular permutation index used at step 704 may be determined so that the OFDM symbol satisfies a PAPR criteria. The OFDM symbol may satisfy the PAPR criteria when the PAPR of the OFDM symbol is less than a threshold.

In one embodiment, the method 700 may determine the modular permutation index so that a PAPR of the OFDM symbol is less than a threshold. In another embodiment, the method 700 may determine the modular permutation index for a predetermined number of signals that are to be processed by performing a modular permutation on the signals in the frequency domain using the modular permutation index. In yet another embodiment, the method 700 may determine a range of permutation indexes, and the modular permutation index is selected from the range of permutation indexes. The modular permutation index may be signaled in downlink control information. In another embodiment, a pilot reference signal may be transmitted, where a modular permutation is performed on the pilot reference signal using the modular permutation index.

In one embodiment, the method 700 may process the first signal at step 704 by performing the modular permutation in accordance with the modular permutation index on the first signal and then performing a cyclic shift in accordance with a cyclic shift parameter on an output signal resulted from performing the modular permutation on the first signal. The cyclic shift parameter is an integer less than the number of DFT points. The modular permutation index and the cyclic shift parameter may be determined so that a PAPR of the OFDM symbol is less than a threshold.

Figure 8:
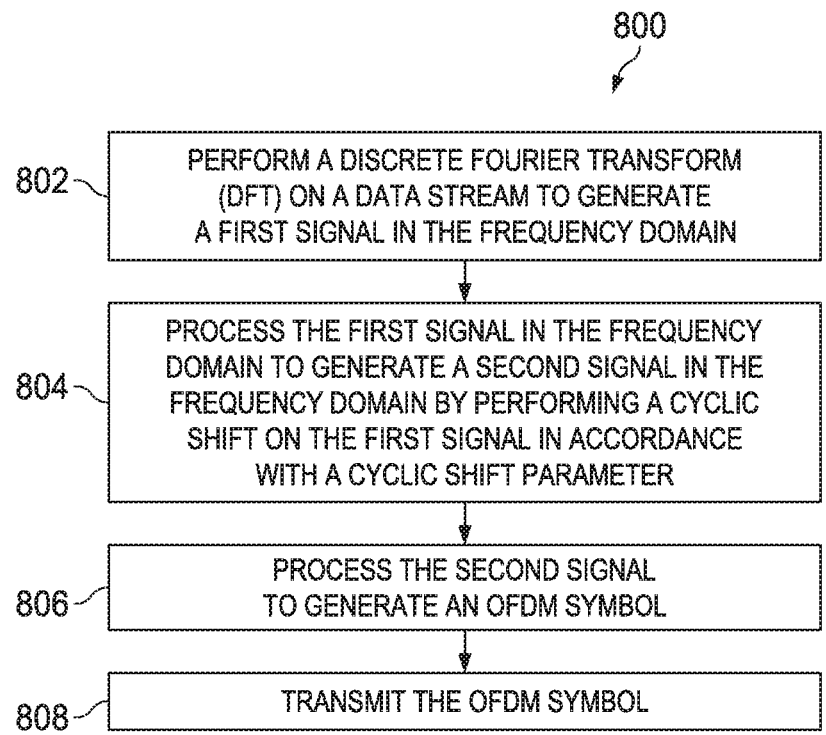
FIG. 8 illustrates a flowchart of another embodiment method for wireless communications.

FIG. 8 illustrates a flowchart of another embodiment method 800 for wireless communications. At step 802, the method 800 performs a DFT on a data stream to generate a first signal in the frequency domain. At step 804, the method 800 processes the first signal in the frequency domain to generate a second signal in the frequency domain by performing a cyclic shift on the first signal in accordance with a cyclic shift parameter. The cyclic shift parameter is an integer less than a number of DFT points used in performing the DFT. At step 806, the method 800 processes the second signal to generate an OFDM symbol. At step 808, the method 800 transmits the OFDM symbol. The cyclic shift parameter is determined so that the OFDM symbol satisfies a PAPR criteria. The OFDM symbol may satisfy the PAPR criteria when the PAPR of the OFDM symbol is less than a threshold.

In one embodiment, the method 800 may determine the cyclic shift parameter so that a PAPR of the OFDM symbol is less than a threshold. In another embodiment, the method 800 may determine the cyclic shift parameter for a predetermined number of signals that are to be processed by performing a cyclic shift on the signals in the frequency domain using the cyclic shift parameter. In yet another embodiment, the method 800 may determine a range of cyclic shift parameters, and the cyclic shift parameter is selected from the range of cyclic shift parameters. The cyclic shift parameter may be signaled in downlink control information. Alternatively, a pilot reference signal may be transmitted, where a cyclic shift is performed on the pilot reference signal using the cyclic shift parameter.

In one embodiment, the first signal in the frequency domain may be processed at step 804 by performing a modular permutation on the first signal in accordance with a modular permutation index prior to performing the cyclic shift in accordance with the cyclic shift parameter, where the modular permutation index is an integer, and the greatest common divisor of the modular permutation index and the number of DFT points is equal to one. The modular permutation is a modular arithmetic operation that rearranges an order of elements in a sequence of the first signal. The modular permutation index and the cyclic shift parameter may be determined or selected so that a PAPR of the OFDM symbol is less than a threshold.

Figure 9:
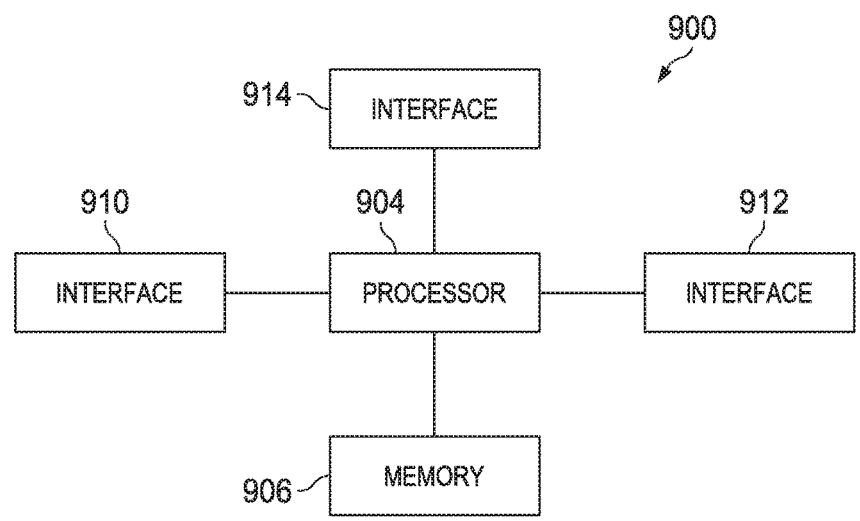
FIG. 9 illustrates a block diagram of an embodiment processing system.

FIG. 9 illustrates a block diagram of an embodiment processing system 900 for performing methods described herein, which may be installed in a host device. As shown, the processing system 900 includes a processor 904, a memory 906, and interfaces 910-914, which may (or may not) be arranged as shown in FIG. 9. The processor 904 may be any component or collection of components adapted to perform computations and/or other processing related tasks, and the memory 906 may be any component or collection of components adapted to store programming and/or instructions for execution by the processor 904. In an embodiment, the memory 906 includes a non-transitory computer readable medium. The interfaces 910, 912, 914 may be any component or collection of components that allow the processing system 900 to communicate with other devices/components and/or a user. For example, one or more of the interfaces 910, 912, 914 may be adapted to communicate data, control, or management messages from the processor 904 to applications installed on the host device and/or a remote device. As another example, one or more of the interfaces 910, 912, 914 may be adapted to allow a user or user device (e.g., personal computer (PC), etc.) to interact/communicate with the processing system 900. The processing system 900 may include additional components not depicted in FIG. 6, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network. In some embodiments, one or more of the interfaces 910, 912, 914 connects the processing system 900 to a transceiver adapted to transmit and receive signaling over the telecommunications network.

Figure 10:
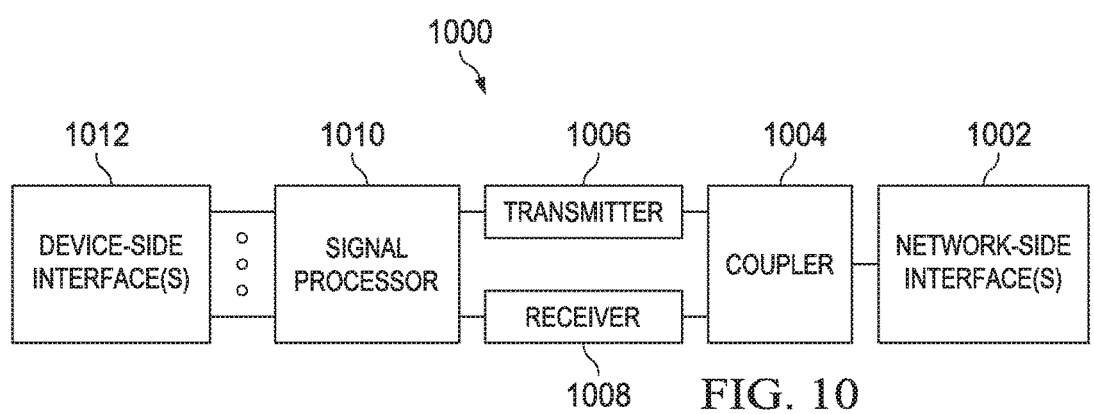
FIG. 10 illustrates a block diagram of a transceiver adapted to transmit and receive signaling over a telecommunications network.

FIG. 10 illustrates a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and one or more device-side interfaces 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, and/or a performing unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for wireless communications, comprising:
    determining, by a device, a modular permutation index, the modular permutation index being an integer and used for performing a modular permutation on a first signal in a frequency domain, wherein the modular permutation is a modular arithmetic operation, and the greatest common divisor of the modular permutation index and a number of a discrete Fourier transform (DFT) points used for processing the first signal is equal to one, and wherein the modular permutation index is determined so that the first signal after the modular permutation is performed satisfies a peak to average power ratio (PAPR) criteria; and
    processing, by the device, the first signal in the frequency domain to generate a second signal in the frequency domain, wherein processing the first signal comprises performing a modular permutation on the first signal in accordance with the modular permutation index, and wherein the modular permutation is performed by rearranging an order of elements in a sequence of the first signal, wherein the second signal satisfies the PAPR criteria.

2. The method of claim 1, wherein the PAPR criteria is satisfied when a PAPR of the second signal is less than a threshold.

3. The method of claim 1, wherein determining the modular permutation index comprises determining the modular permutation index such that a PAPR of the second signal is less than a threshold.

4. The method of claim 1, wherein processing the first signal in the frequency domain further comprises performing a cyclic shift in accordance with a cyclic shift parameter on an output signal that results from performing the modular permutation on the first signal, wherein the cyclic shift parameter is an integer that is less than the number of DFT points.

5. The method of claim 4, wherein the modular permutation index and the cyclic shift parameter are determined so that a PAPR of the second signal is less than a threshold.

6. The method of claim 1, wherein the modular permutation index is signaled in downlink control information.

7. The method of claim 1, further comprising transmitting a pilot reference signal, wherein a modular permutation is performed on the pilot reference signal using the modular permutation index.

8. The method of claim 1, wherein the modular permutation index is determined for a predetermined number of signals that are processed by performing a modular permutation on the predetermined number of signals in the frequency domain according to the modular permutation index.

9. The method of claim 1, further comprising determining a range of permutation indexes, wherein the modular permutation index is selected from the range of permutation indexes.

10. A method for wireless communications, comprising:
    processing, by a device, a first signal in a frequency domain to generate a second signal in the frequency domain, wherein processing the first signal comprises performing a cyclic shift on the first signal in accordance with a cyclic shift parameter, the cyclic shift parameter being an integer less than a number of discrete Fourier transform (DFT) points used in performing a DFT, wherein the cyclic shift parameter is determined so that the second signal satisfies a peak to average power ratio (PAPR) criteria.

11. The method of claim 10, wherein the second signal satisfies the PAPR criteria when a PAPR of the second signal is less than a threshold.

12. The method of claim 10, further comprising determining the cyclic shift parameter so that a PAPR of the second signal is less than a threshold.

13. The method of claim 10, wherein processing the first signal in the frequency domain further comprises performing a modular permutation on the first signal in accordance with a modular permutation index prior to performing the cyclic shift on the first signal, wherein the modular permutation index is an integer, and the greatest common divisor of the modular permutation index and the number of DFT points is equal to one, and wherein the modular permutation is a modular arithmetic operation that rearranges an order of elements in a sequence of the first signal.

14. The method of claim 13, further comprising determining the modular permutation index and the cyclic shift parameter so that a PAPR of the second signal is less than a threshold.

15. The method of claim 10, wherein the cyclic shift parameter is signaled in downlink control information.

16. The method of claim 10, further comprising transmitting a pilot reference signal, wherein a cyclic shift is performed on the pilot reference signal using the cyclic shift parameter.

17. The method of claim 10, wherein the cyclic shift parameter is determined for a predetermined number of signals that are processed by performing a cyclic shift on the predetermined number of signals in the frequency domain according to the cyclic shift.

18. The method of claim 10, further comprising determining a range of cyclic shift parameters, wherein the cyclic shift parameter is selected from the range of cyclic shift parameters.

19. A device, comprising:
a memory storage comprising instructions; and
one or more processors in communication with the memory storage, wherein the one or more processors execute the instructions to:
   determine a modular permutation index, the modular permutation index being an integer and used for performing a modular permutation on a first signal in a frequency domain, wherein the modular permutation is a modular arithmetic operation, and the greatest common divisor of the modular permutation index and a number of a discrete Fourier transform (DFT) points used for processing the first signal is equal to one, and wherein the modular permutation index is determined so that the first signal after the modular permutation is performed satisfies a peak to average power ratio (PAPR) criteria; and
   perform a modular permutation on the first signal in accordance with the modular permutation index to generate a second signal, the modular permutation being performed by rearranging an order of elements in a sequence of the first signal, wherein the second signal satisfies the PAPR criteria.

20. A device, comprising:
a memory storage comprising instructions; and
one or more processors in communication with the memory storage, wherein the one or more processors execute the instructions to:
   perform a cyclic shift on a first signal in a frequency domain in accordance with a cyclic shift parameter to generate a second signal, the cyclic shift parameter being an integer less than a number of discrete Fourier transform (DFT) points used in performing a DFT, wherein the cyclic shift parameter is determined so that the second signal satisfies a peak to average power ratio (PAPR) criteria.

* * * * *